Patented Feb. 16, 1932

1,845,403

UNITED STATES PATENT OFFICE

OTTO EISLEB, OF HOFHEIM-IN-TAUNUS, GERMANY, ASSIGNOR TO WINTHROP CHEMICAL COMPANY, INC., OF NEW YORK, N. Y., A CORPORATION OF NEW YORK

N-SUBSTITUTED 1.3-DIAMINO-2-PROPANOLS AND PROCESS OF PREPARING THEM

No Drawing. Application filed November 6, 1929, Serial No. 405,281, and in Germany August 3, 1926.

My present invention relates to asymmetrically substituted 1.3-diamino-2-propanols and to a process of preparing them.

In my co-pending U. S. patent application Ser. No. 209,177 the preparation of new substituted 1.3-diamino-2-propanols has been described, by subjecting an alpha-tertiary-amino-epihydrin to reaction with a nitrogen base such as ammonia or a primary or secondary amine. In particular I have described the preparation of new compounds, being formed from an alpha-tertiary-amino-epihydrin acted upon with ammonia or a primary amine.

In the following the preparation of new asymmetrically substituted di-tertiary 1.3-diamino-2-propanols is described. The reaction takes place according to the following equations:

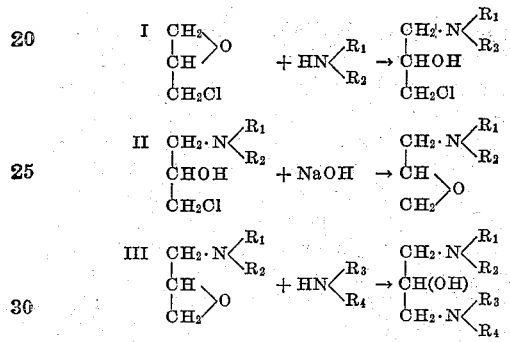

In the above formulæ $R_1$ and $R_2$ as well as $R_3$ and $R_4$ stand for alkyl, aryl or carbon atoms belonging to a heterocyclic nitrogen containing nucleus.

In this manner compounds are obtainable containing two tertiary-amino groups unequally substituted by organic radicals. The new compounds can be represented by the general formula:

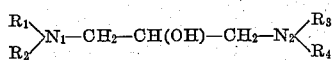

wherein $N_1$ and $N_2$ either represent nitrogen of a tertiary amine, and $R_1$ and $R_2$ as well as $R_3$ and $R_4$ stand for alkyl, aryl or carbon atoms belonging to a heterocyclic nitrogen containing nucleus, either $R_1$ or $R_2$ being different from either $R_3$ or $R_4$.

The asymmetrically substituted di-tertiary 1.3-diamino-2-propanols are intended to be used as intermediate products in the manufacture of therapeutic agents.

The following examples serve to illustrate my invention, but they are not intended to limit it thereto, the parts being parts by weight:

1. Preparation of 1-dimethylamino-3-piperidino-2-propanol and piperidinoepihydrin:

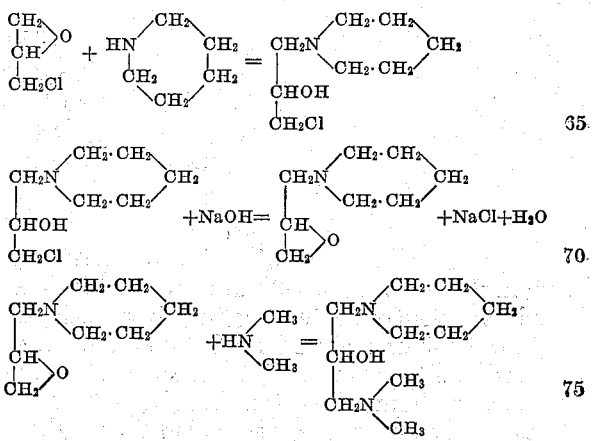

Into 100 parts of epichlorhydrin are introduced drop by drop 98 parts of piperidine at a temperature of 28° C. to 30° C. while stirring and cooling in a suitable manner. The heat evolved during the reaction is very considerable. After one to one and a half hours the heat has entirely abated. The mixture is allowed to stand for a further three hours and then first shaken out with a 20% solution of potassium carbonate and then again with 150 parts by volume of a caustic soda solution of 40° Bé. for one hour. The thin liquid oil layer is separated, dried over potassium hydroxide and distilled in a vacuum. It distils over at 72° C. to 77° C. under 8 mm. pressure. 141 parts of piperidinoepihydrin thus obtained and 100 parts of an aqueous dimethylamine solution of 50% strength are mixed. The self-heating which thereby occurs is counter-acted by cooling in such a manner that the temperature does not rise above 60° C. After some hours the mixture is distilled in a vacuum and the 1-dimethylamino-3-piperidino-2-propanol is obtained in a nearly theoretical yield as a colorless oil which distils over at 104° C. under 5 mm. pressure. It is miscible with water in each proportion.

2. Preparation of 1-dimethylamino-3-phenyl-methyl-amino-2-propanol and phenyl-methyl-aminoepihydrin:

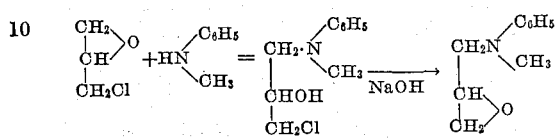

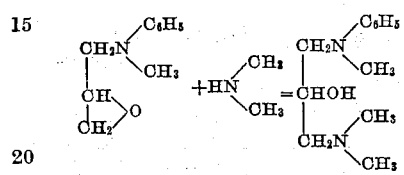

318 parts of monomethylaniline, 300 parts of methyl alcohol and 300 parts of epichlorhydrin are gently heated together in a flask on the water-bath and under reflux cooling. The mass soon begins to boil which continues for about one hour after stopping the supply of heat. The mixture is then boiled for another 6 hours in the reflux apparatus, at the end of which time all epichlorhydrin has been transformed which is shown by the fact that a test sample gives a clear solution in diluted sulfuric acid. After the ethyl alcohol has been distilled off in a vacuum at 60° C., the residue is mixed and stirred for 2 hours with 450 parts by volume of caustic soda solution of 40° Bé. The oil layer is separated, once well shaken with a caustic potash solution of 50% strength, again separated and distilled in a vacuum; the product distils over at 132° C. to 135° C. under 8 mm. pressure, or at 160° C. to 162° C. under 30 mm. pressure. The product is an oil, smelling, but very slightly, like dimethylaniline, being almost colorless and dissolving very sparingly in water. 163 parts of phenyl-methyl-amino-epihydrin thus obtained and 100 parts of an aqueous dimethylamine solution of 50% strength are shaken together, the self-heating which soon occurs being counter-acted by cooling in such a manner that the temperature does not exceed 50° C. When self-heating does not take place any longer, the mixture is heated for 1 hour on the water-bath. Then it is distilled in a vacuum; after the water has distilled over, the product distils over at 140° C. under 5 mm. pressure as a feebly yellowish oil of a feebly basic, but not characteristic smell. The yield amounts to 205 parts. Under ordinary pressure the product boils at about 300° C., while slightly decomposing.

3. Preparation of 1-perhydro-carbazolo-3-diethylamino-2-propanol and diethylamino-epihydrin:

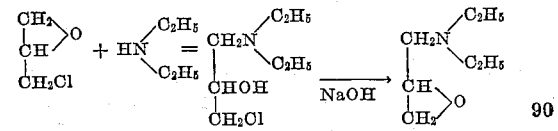

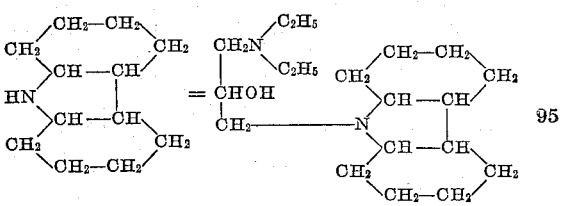

463 parts of epichlorhydrin, 10 parts of water and 360 parts of diethylamine are mixed, while stirring and cooling. There is a gradual self-heating of the mixture. This self-heating is counter-acted by cooling in a suitable manner to such an extent that the temperature of the mixture remains between 28° C. and 30° C. When, after about 2 hours, the heat evolved during the reaction has abated, the mixture is kept for another 2 to 3 hours at 28° C. to 30° C. by a suitable external heating. The product of the reaction is then shaken out with 500 parts by volume of a 20% solution of potassium carbonate and after the latter has been separated, the product is again well shaken with 600 parts by volume of caustic soda solution of 40° Bé. for 45 to 60 minutes during which operation sodium chloride separates with slight selfheating. The very mobile layer consisting of crude diethyl-amino-epihydrin is separated from the salt solution, well shaken for a short time with a caustic potash solution of 50% strength and after isolation distilled in a vacuum. The product, which runs over at 40° C. to 50° C. under 8 mm. pressure is collected, its boiling point under 760 mm. pressure being 155° C. to 159° C. It is a colorless very mobile liquid of an intensely basic smell, is miscible with water and can be re-separated from its aqueous solution by means of a caustic soda solution. On storing the substance for a considerable time, it gradually undergoes some change in that a viscous oil separates. 179 parts of perhydro-carbazol and 129 parts of diethylamino-epihydrin thus obtained are heated for 3 hours on the water bath. The reaction heat causes for some time the temperature of the mixture to rise some degrees above the temperature of the water bath, but in the course of half an hour it falls again. On distilling the new product runs over at 214° C. under 11 mm. pressure as a nearly colorless oil of a quite feebly basic smell.

4. Alpha-(6-methoxy-1.2.3.4-tetrahydro-isoquinolino-)-gamma-diethylamino-beta-propanol:

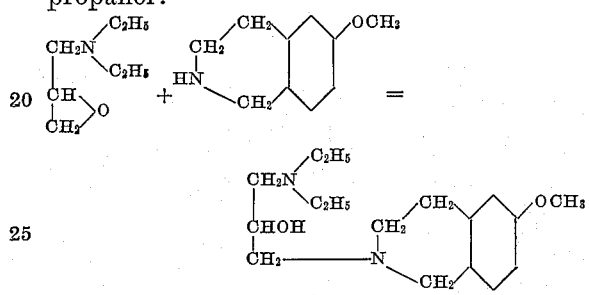

163 parts of 6-methoxy-1.2.3.4-tetrahydro-isoquinoline and 129 parts of diethylamino-epihydrin are mixed and the mixture is kept for 3 hours at 50° C. and for 1 hour at water-bath temperature. On fractionating the new product distils over at about 195° C. under 3 mm. pressure. It is a feebly yellowish, nearly odorless oil and yields a strongly hygroscopic solid dihydrochloride.

The nitrogen atoms can also be substituted by aliphatic or aromatic residues other than the methyl groups, ethyl groups and phenyl groups above described; all of their substituents can be of an aliphatic nature; it is, however, also possible that both nitrogen atoms are substituted by aromatic or mixed aliphatic-aromatic residues.

Instead of the piperidino- or perhydrocarbazol residue there can also stand other heterocyclic residues containing an imido group in the nucleus.

Furthermore compounds can be obtained both nitrogen atoms of which are ring members of heterocyclic compounds, for instance, by causing piperidino-epihydrin (Example 1) to react with 6-methoxy-1.2.3.4-tetrahydro-oxyquinoline.

This application contains subject matter in common with my co-pending application Ser. No. 209,177, filed July 28, 1927, and is to be regarded as a continuation-in-part of said application.

I claim:

1. The process which comprises causing a secondary amine to react with epichlorhydrin in monomolecular proportions, treating the intermediate product thus obtained with caustic alkali, and then treating the resulting compound with a secondary amine being different from the former.

2. The process which comprises causing a secondary amine of the following type:

wherein $R_1$ and $R_2$ stand for alkyl, aryl or carbon atoms belonging to a heterocyclic nitrogen containing nucleus, to react with epichlorhydrin in monomolecular proportions, treating the intermediate product thus obtained with caustic alkali and then treating the resulting compound with a secondary amine being different from the former.

3. The process which comprises causing piperidine to react with epichlorhydrin in monomolecular proportions, treating the intermediate product thus obtained with caustic alkali, and then treating the resulting compound with a secondary amine of the following type:

wherein $R_3$ and $R_4$ stand for alkyl, aryl or carbon atoms belonging to a heterocyclic nitrogen containing nucleus, whereby the amines are different from one another.

4. The process which comprises causing piperidine to react with epichlorhydrin in monomolecular proportions, treating the intermediate product thus obtained with caustic alkali, and then treating the resulting compound with dialkylamine.

5. The process which comprises causing piperidine to react with epichlorhydrin in monomolecular proportions, treating the intermediate product thus obtained with caustic alkali and then treating the resulting compound with dimethylamine.

6. As new products, the compounds of the general formula:

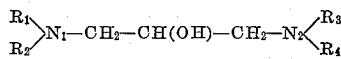

wherein $N_1$ and $N_2$ represent nitrogen of a tertiary amine, $R_1$ and $R_2$ represent alkyl, aryl or carbon atoms belonging to a heterocyclic nitrogen containing nucleus, and $R_3$ and $R_4$ represent alkyl, $R_1$ and $R_2$ being different from $R_3$ and $R_4$.

7. As new products, the compounds of the general formula:

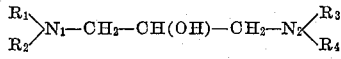

wherein $N_1$ and $N_2$ represent nitrogen of a tertiary amine, $R_1$ and $R_2$ represent carbon atoms belonging to a heterocyclic nitrogen containing nucleus and $R_3$ and $R_4$ both represent alkyl.

8. As a new product, the 1-piperidino-3- dimethylamino-2-propanol of the formula:

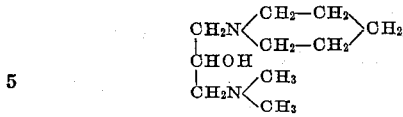

being a colorless oil miscible with water in each proportion.

9. As a new product, alpha-(6-methoxy-1.2.3.4-tetrahydroisoquinolino)-gamma-diethylamino-beta-propanol of the formula:

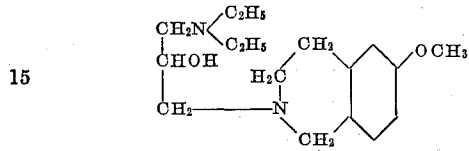

being a feebly yellowish, nearly odorless oil and forming with hydrochloric acid a very hygroscopic solid dihydrochloride.

10. As a new product, 1-perhydrocarbazolo-3-diethylamino-2-propanol of the formula:

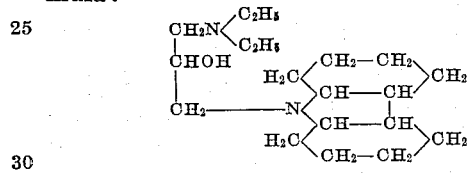

being a nearly colorless oil of a quite feebly basic smell.

In testimony whereof, I affix my signature.

OTTO EISLEB.